Figure 1:
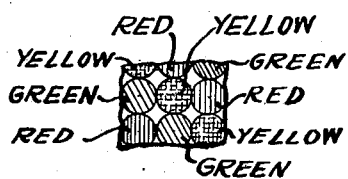

July 27, 1954  T. H. NAKKEN  2,684,885
COLOR TELEVISION TUBE AND METHOD OF MAKING SAME
Filed Nov. 30, 1950

ENLARGED SMALL SECTION OF SCREEN
SHOWING COLORS PRODUCED BY VARYING
THE INTENSITY OF THE ELECTRON BEAM.

INVENTOR
THEODORE H. NAKKEN.
BY
ATTORNEY

Patented July 27, 1954

2,684,885

UNITED STATES PATENT OFFICE 2,684,885

COLOR TELEVISION TUBE AND METHOD OF MAKING SAME

Theodore H. Nakken, New York, N. Y.

Application November 30, 1950, Serial No. 198,499

17 Claims. (Cl. 316—1)

This invention relates to television cathode ray tubes, and has as an object the provision of means and methods for manufacturing such tubes in such manner that successful multicolor tubes can be made in which the color dot pattern is congruent with the sweeping pattern of the cathode ray itself.

My invention may be understood in all its details by all those versed in the art by a study of the drawings and following specification.

Figure 2:
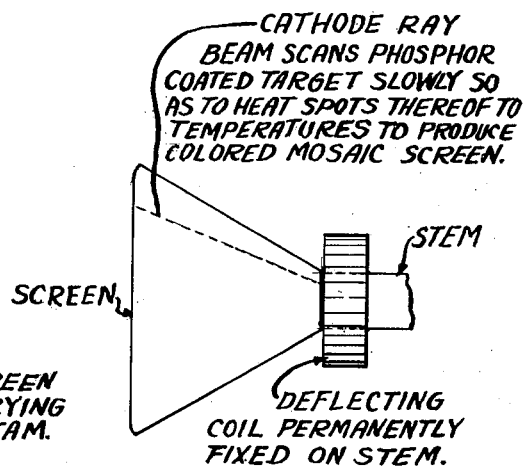

In the drawings:

Figure 1 is an enlarged small section of the screen of the television tube of Figure 2, showing colors produced by varying the intensity of the electron beam; and Figure 2 is a fragmentary view of a cathode ray tube, showing the deflecting coil permanently fixed on the stem of the tube prior to forming the colored mosaic screen by the beam therein.

Everyone familiar with the art knows, or should know, that for focusing and moving the cathode ray beam quasi-optical means are employed. Into the final shape of the image produced by the TV tube there enter, therefore, the characteristics of the optical or quasi-optical systems used for focusing and deflecting the beam in its prescribed course necessary for the production of an image. These quasi-optical means, as is the case with all optical systems, are subject to so-called optical aberrations, only more so, due to the methods necessary in the manufacture of the tube itself and its direct accessories.

In true optical apparatus lenses or objectives are made to almost uncanny accuracies and are constantly checked during manufacture by means of check lenses of known accuracy, so as to attain a degree of precision unattained in any other art.

The quasi-optical parts in a cathode ray tube simply cannot be manufactured to such an ideal degree of precision: they are made of metal stampings within normal mechanical limits of precision, limits which, in optical terms, would constitute only the start of the process. But, even if optical accuracy in the manufacture of such tubes could be attained, the parts so made and assembled must be degassed after having been placed in the tube, and for that purpose are raised to red or almost white heat. No "perfect" system could emerge from this treatment with its original accuracy. Its final deviations depend on a multitude of factors which simply cannot be controlled. This applies in every sense to tubes with built-in deflectors.

The same thing may be said of accessory apparatus for use with cathode ray tubes which are focused and the rays of which are deflected electro-magnetically. No two focusing coils can possibly be alike, nor are two deflection coils exactly alike. Installation of such devices with optical precision is simply impossible in a commercial product, if at all.

The result is that no two television tubes are alike. They are, one and all, subject to optical or quasi-optical distortions which vary from tube to tube, and from accessory apparatus to accessory apparatus.

When viewing a black and white TV image, one does not notice these distortions, nor takes them into the bargain. Normally one will notice this distortion only when observing the test pattern of the transmitting station. Only then does it become apparent that there may be barrel distortion in one corner of the image, pincushion distortion in another, astigmatism here, coma there, and lack of rectilinearity everywhere. With all of these aberrations one can, just the same, follow a baseball game, other sports and practically any other subject on television.

These aberrations now vary from tube to tube, and even the same tube will show different aberrations in different receivers, i. e. with different accessories: focusing and deflecting apparatus, unless the tube is one with electrostatic, built-in deflecting plates.

While these aberrations do not materially detract from the enjoyment of pictures in black and white, they play an important role in any attempt at color reproduction by the second method discussed: not when the first method is used. And here I have put my finger on the reason why all demonstrations of the second method of necessity resulted in unsatisfactory performances.

In order to obtain true color reproduction, the electron beam in the receiver must hit a red spot on its screen when a red impulse is being received, and the same is true for the yellows and blues. Transmission of red, yellow or blue impulses in the transmitting station can be controlled by a standard pattern of varicolored dot-filter, but a standard dot-filter for the viewing tube is an impossibility by virtue of the facts hereabove enumerated.

The unavoidable conclusion to be drawn from the above is this: Every receiver viewer tube, being different from any other one, must have a screen pattern individual to itself, and unlike any other one. This screen pattern must be a replica of the standard pattern used in the transmitting station with the aberrational deviations peculiar to the receiving tube itself, as an individual.

Realization of this fundamental fact makes one aware that successful apparatus of the second classification can be achieved only if the screen pattern is created by means available in and inherent to the tube itself, including all of the scanning accessories. Only thus can the aberrations inherent in the tube be incorporated in the screen pattern and their effects be nullified, to all intents and purposes.

As these aberrations are manifested by the scanning pattern of the electron beam, the question arises whether this beam per se may be utilized to create the screen pattern. Since this is both possible and feasible, systems according to the second method will be equivalent, in every respect, to the system of the first class, and offer the advantage of:

First, complete absence of mechanical devices;
Second, automatic operation; and
Third, removal of limitations in tube sizes which may be employed for color television.

*Electron beam per se forms screen*

The question arises in what manner a beam of electrons may effect material changes in matter in such manner that a color dot pattern may be formed in the sense discussed hereinabove. It will be obvious to those versed in the art, that the electron beam, besides being able to cause phosphors to fluoresce, is inherently a carrier of energy, from its origin to its point of impact, and that this energy carried is apt to manifest itself in the form of heat. This fact becomes apparent if the electron beam in a cathode ray tube is left stationary for a moment at high intensity; it then will damage the phosphor by burning it away.

It is then perceived that the electron beam, with careful manipulation, may be used as a highly localized source of heat, and thus may be utilized for applying to the screen localized heat treatment for the purpose of creating a color screen pattern, which will be characterized by all of the aberrations inherent in the tube, provided ways and means are available to do so by means of such locally applied heat.

A study of various phosphors which can be used in TV tubes reveals that several of them exist in different crystalline forms, and that some of them emit differently colored light in different form. For instance, one of the best known and efficient phosphors exists in three different crystalline forms, i. e. zinc ortho-silicate, the $\alpha$, $\beta$ and $\gamma$ forms, the last being the least stable of the three. These three forms of this material, activated with manganese, fluoresce, respectively, in bright green, canary yellow and red. The $\gamma$ form changes, at from 300 to 400° C. into the $\beta$ form, which, upon being heated to 900° C. changes into the $\alpha$ form. It is seen then, that if a tube were given a screen made of the red radiating $\gamma$ form, the mere application of local heat by means of the electron beam enables me to construct, in a tube with a fluorescent screen of this material, a varicolored pattern in any shape desired.

Thus, in order to achieve the object of my invention, I fabricate the television tube in the size intended. In the case of a tube with electrostatic deflectors these are an inherent part of the tube construction; in the case of magnetically deflected tubes the deflecting and focussing coils are mounted permanently on the tube.

When the tubes are completed and evacuated, but preferably still on the evacuating system, they are energized and the formation of the differentiated dot-color screen can commence. To this end a great number of tubes may be treated simultaneously.

Impulses are now sent into the deflecting means at a very slow rate, so that the electron beam traverses its course at a very slow rate. Furthermore the electron beam is modulated in intensity by means of a signalling system of following characteristics:

Wherever the screen, in later use, is supposed to luminesce with red color, the slowly moving electron beam is weakened or suppressed completely, so that no change takes place in the phosphor in such spots. Wherever there must appear a yellow dot on the screen, the electron beam is intensified so as to heat the phosphor to a temperature well above 400° C. but far below 900° C. This action converts the phosphor from the $\gamma$ form to the $\beta$ form, and thereafter, in actual use, the tube will emit yellow radiations from these dots when activated by a passing electron beam.

The final step in the formation of the color screen is then to obtain the third color, green, in the third group of color dots, and this can be done once more by energizing the electron beam to such a degree that the phosphor in these dots is heated to a temperature higher than 900° C., where the $\gamma$ phosphor will pass through the $\beta$ stage to the green light emitting $\alpha$ stage. When so changing the color emitted by the phosphor, it is evident that the change from red to yellow and from red to green may be carried on simultaneously. In order to achieve this end, all that is necessary is to suppress the electron beam where red dots are wanted in the screen, use moderate "heat" for the creation of the yellow dots, and increase the current in the beam for the creation of the green dots. Control of these operations may be obtained in a number of ways, provided they lead to the formation of the color dots in a generally agreed upon pattern or mosaic.

Of course I realize that most color schemes use red, yellow and blue, rather than red, yellow and green. In order to achieve this end, I may mix, with the phosphor an uncooked or "raw" glaze, which vitrifies at a temperature beyond that used for the formation of the form of the phosphor, but also at a temperature corresponding to that at which I form the green phosphor. Such glazes are readily available commercially.

The example, zinc ortho-silicate, is not the only phosphor which may serve my purpose, as the number and variations in phosphors are vast and as many of them are sensitive to differential temperature treatment. Also other phosphors may be developed which, without the addition of any foreign admixture, as a glaze, will make it possible to form color screens electronically in the three desired colors. Likewise there exist, or can be manufactured, glazes or mixtures of glazes which, upon differential heat treatment by means of an electron beam, will assume two or even three of the colors in the screen. In that case a white phosphor would be indicated in the case of a tri-color glaze or, in the case of a two-color glaze, the phosphor should normally exhibit the third color needed and change in color of radiation after heat treatment so as to be able to supply the color transmitted by the locally developed glaze.

Such variations in my process obviously would fall within the scope of my invention, which concerns the formation of the color screen or grating by means of the electron beam itself, thus incorporating within the tube a color screen which is, fundamentally a modified replica of the transmission screen, but in which replica, tube for tube, this screen is distorted by the aberrations peculiar to every TV receiving tube as an individual.

What is claimed is:

1. The method of forming a multi-color screen within a color television receiving tube, in accordance with a predetermined color pattern, which comprises deflecting the electron beam of said tube in the manner it is to be deflected when used as a receiving tube, and varying the intensity of said beam to differentially heat the constituents of said screen to produce and retain said pattern.

2. The method of forming the screen of a color television receiving tube while the same is being manufactured which includes the step of applying thermal color responsive constituents to the area in which the screen is to be disposed, and the steps of causing an electron beam in said tube to traverse said area in accordance with a predetermined pattern, and at the same time varying the intensity of said beam to produce fixed colors in accordance with the relative disposal of the several colors in said pattern.

3. The method of forming a multi-color screen within a color television receiving tube, wherein a predetermined color pattern is desired, which comprises deflecting the electron beam of said tube in accordance with the form of said pattern and varying the intensity of said beam to differentially heat the constituents of said screen to produce permanent spots comprising the colors of said pattern.

4. The method of forming a multi-color screen within a television receiving tube which includes the step of applying a coating on the target area of said tube, said coating including a phosphor which is changed in characteristics by differential heat treatment by means of the electron beam therein, and the steps of causing the electron beam of said tube to scan said target area in a predetermined pattern, varying the intensity of said beam to obtain spot temperatures in said coating for permanently reducing said phosphor in accordance with the color phases of said pattern.

5. The method of forming a multi-color screen in a television receiving tube which includes, the step of applying a coating including at least one phosphor on the target area of said tube, said phosphor being adapted to have its color characteristics permanently changed by differential heat treatment by means of the electron beam of said tube, the step of causing said beam to scan said target area, and the steps of varying the intensity of said beam, in accordance with a predetermined color pattern, as the scanning of said area is effected.

6. The method of forming a multi-color screen in a television receiving tube which comprises, the step of applying a coating including a phosphor and a glazing frit on the target area of said tube, said coating being adapted to have its color characteristics permanently changed locally by heat treatment applied by means of the electron beam of the tube itself, the step of causing said beam to scan said target area, and the steps of varying the intensity of said beam, in accordance with a predetermined color pattern, as the scanning of said area is effected.

7. The method of forming a multi-color screen in a television receiving tube which comprises, the step of applying a coating including at least one phosphor and a glaze on the target area of said tube, said coating being adapted to have its color characteristics permanently changed locally by heat treatment applied by means of the electron beam of the tube itself, the step of causing said beam to scan said target area, and the steps of varying the intensity of said beam, in accordance with a predetermined color pattern, as the scanning of said area is effected.

8. The method of forming a multi-color screen in a television receiving tube which comprises, the step of applying a coating including at least one phosphor and at least one glazing frit on the target area of said tube, said coating being adapted to have its color characteristics changed locally by heat treatment applied by means of the electron beam of the tube itself, the step of causing said beam to scan said target area, and the steps of varying the intensity of said beam to form permanent color spots, in accordance with a predetermined color pattern, as the scanning of said area is effected.

9. In a television receiving tube, an electron gun for generating an electron beam, a target area to be traversed by said beam, and a coating on said area containing constituents of which the color characteristics may be permanently changed by differential heat treatment.

10. In a television receiving tube, an electron gun for generating an electron beam, a target area to be traversed by said beam, and a coating on said area which includes at least one phosphor the color characteristics of which are adapted to be permanently changed by differential heat treatment by said beam.

11. In a television receiving tube, an electron gun for generating an electron beam, a target area to be traversed by said beam, and a coating on said area which includes a phosphor and a frit adapted to be differentially heat treated subsequently by said beam to form several permanent colors.

12. In a television receiving tube, an electron gun for generating an electron beam, a target area to be traversed by said beam, and a coating on said area which includes a phosphor and at least one frit adapted to be differentially heat treated subsequently by means of said beam to form several permanent colors.

13. In a television receiving tube, an electron gun for generating an electron beam, a target area to be traversed by said beam, and a coating on said area containing constituents capable of being reduced to different permanent colors when spot heated differentially by means of said beam.

14. In a television receiving tube, an electron gun for generating an electron beam, a target area to be traversed by said beam, a coating on said area containing constituents of which the color characteristics may be changed by differential heat treatment, and deflecting means for said beam permanently associated with said tube, said deflecting means being adapted to motivate said beam while forming said coating into a permanent multi-color screen, and thereafter, when used in a receiving circuit, to correlate said beam with the color patterns of said screen.

15. In a television receiving tube, an electron gun for generating an electron beam, a target area to be traversed by said beam, a coating on said area containing constituents capable of being reduced to different permanent colors when spot heated differentially by means of said beam, and deflecting means for said beam non-displaceably mounted on said tube, said deflecting means being adapted to motivate said beam while forming said coating into a multi-color screen, and thereafter to correlate said beam with the color patterns of said screen.

16. The method of spot reducing a phosphor to a predetermined permanent color which consists in causing an electron beam of a predetermined intensity to impinge on said phosphor for a period of time necessary to raise the temperature thereof sufficiently to produce said color.

17. The method of spot reducing a phosphor and a frit to a predetermined permanent color which consists in causing an electron beam of a predetermined intensity to impinge on said phosphor for a period of time necessary to raise the temperature thereof sufficiently to produce said color.

References Cited in the file of this patent

UNITED STATES PATENTS

| Number | Name | Date |
|---|---|---|
| 2,307,188 | Bedford | Jan. 5, 1943 |
| 2,440,301 | Sharpe | Apr. 27, 1948 |
| 2,449,752 | Ross | Sept. 21, 1948 |
| 2,455,710 | Szegho | Dec. 7, 1948 |
| 2,529,485 | Chew | Nov. 14, 1950 |